United States Patent
Schulz

(10) Patent No.: US 10,670,403 B2
(45) Date of Patent: Jun. 2, 2020

(54) METHOD FOR DETERMINING A POSITION OF A SINGLE-TRACK VEHICLE AND DEVICE FOR CARRYING OUT THE METHOD

(71) Applicant: Bayerische Motoren Werke Aktiengesellschaft, Munich (DE)

(72) Inventor: Juergen Schulz, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 99 days.

(21) Appl. No.: 15/681,991

(22) Filed: Aug. 21, 2017

(65) Prior Publication Data

US 2017/0343352 A1 Nov. 30, 2017

Related U.S. Application Data

(63) Continuation of application No. PCT/EP2016/051066, filed on Jan. 20, 2016.

(30) Foreign Application Priority Data

Mar. 11, 2015 (DE) .................. 10 2015 204 389

(51) Int. Cl.
*G01C 21/12* (2006.01)
*B60W 40/114* (2012.01)
(Continued)

(52) U.S. Cl.
CPC ....... *G01C 21/12* (2013.01); *B60W 30/18145* (2013.01); *B60W 40/114* (2013.01);
(Continued)

(58) Field of Classification Search
CPC ........... B60W 30/18145; B60W 40/114; G01S 19/49; G01S 19/53
(Continued)

(56) References Cited

U.S. PATENT DOCUMENTS

2008/0184770 A1 8/2008 Sato
2008/0314145 A1 12/2008 Sato
(Continued)

FOREIGN PATENT DOCUMENTS

CN 101890980 A 11/2010
CN 102686476 A 9/2012
(Continued)

OTHER PUBLICATIONS

English Translation of Chinese Office Action issued in counterpart Chinese Application No. 201680003510.1 dated Oct. 8, 2018 (three (3) pages).
(Continued)

*Primary Examiner* — Maceeh Anwari
(74) *Attorney, Agent, or Firm* — Crowell & Moring LLP

(57) ABSTRACT

A method is described for determining a position of a two-wheeled vehicle. The single-track vehicle has a vehicle path yaw rate when driving along curves and a yaw rate according to the inclined orientation which differs from the vehicle path yaw rate. An inclined orientation of the single-track vehicle and a speed of the single-track vehicle are measured. The vehicle path yaw rate of the single-track vehicle is determined from the measured inclined orientation and the measured speed. A device for carrying out the method is also described.

8 Claims, 1 Drawing Sheet

(51) Int. Cl.
*B60W 30/18* (2012.01)
*G01S 19/49* (2010.01)
*G01S 19/53* (2010.01)
*B62K 11/00* (2006.01)

(52) U.S. Cl.
CPC ............. *G01S 19/49* (2013.01); *G01S 19/53* (2013.01); *B60W 2300/36* (2013.01); *B60W 2520/10* (2013.01); *B60W 2520/18* (2013.01); *B60W 2720/14* (2013.01); *B60Y 2200/12* (2013.01); *B60Y 2300/1815* (2013.01); *B62K 11/00* (2013.01); *B62K 2207/02* (2013.01)

(58) Field of Classification Search
USPC ........................................................ 701/472
See application file for complete search history.

(56) References Cited

U.S. PATENT DOCUMENTS

| | | |
|---|---|---|
| 2010/0299028 A1 | 11/2010 | Savaresi et al. |
| 2012/0067122 A1 | 3/2012 | Sakamoto et al. |
| 2012/0259479 A1 | 10/2012 | Yoneta et al. |
| 2015/0291156 A1 | 10/2015 | Yokota |

FOREIGN PATENT DOCUMENTS

| | | |
|---|---|---|
| DE | 10 2006 057 667 A1 | 6/2008 |
| DE | 10 2008 027 621 A1 | 12/2008 |
| DE | 102008027621 A1 * | 12/2008 |
| DE | 10 2010 031 351 A1 | 1/2012 |
| DE | 10 2011 081 253 A1 | 3/2012 |
| EP | 2 476 605 A1 | 7/2012 |
| JP | 5839104 B2 | 1/2016 |
| KR | 10-2014-0021403 A | 2/2014 |

OTHER PUBLICATIONS

International Search Report (PCT/ISA/210) issued in PCT Application No. PCT/EP2016/051066 dated Apr. 1, 2016 with English translation (five pages).

German-language Written Opinion (PCT/ISA/237) issued in PCT Application No. PCT/EP2016/051066 dated Apr. 1, 2016 (five pages).

German Search Report issued in counterpart German Application No. 10 2015 204 389.4 dated Nov. 26, 2015 with partial English translation (11 pages).

* cited by examiner

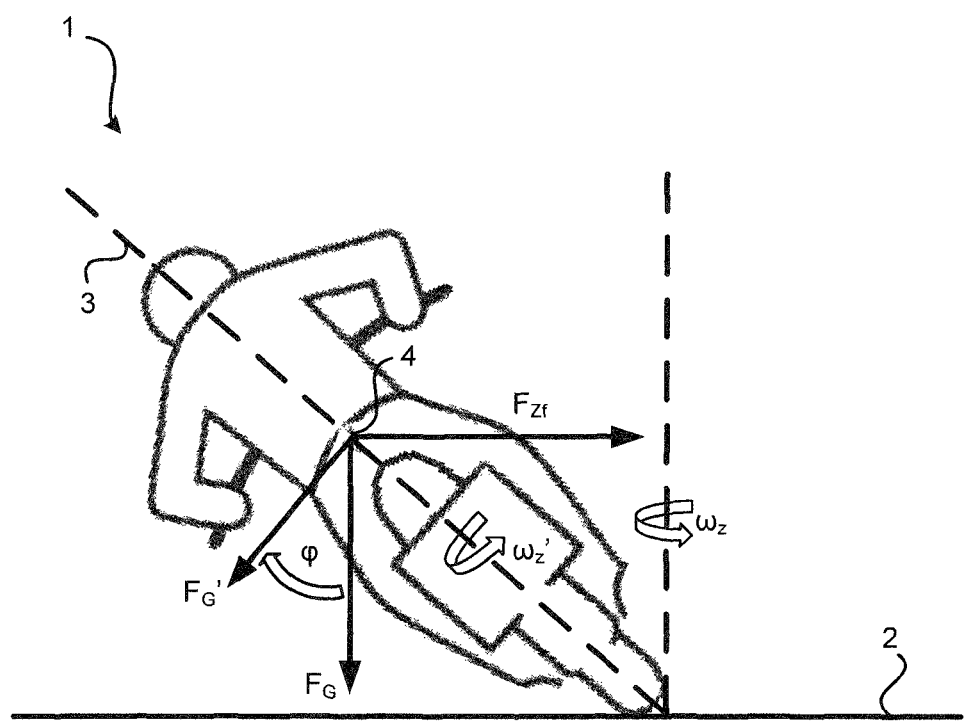

METHOD FOR DETERMINING A POSITION OF A SINGLE-TRACK VEHICLE AND DEVICE FOR CARRYING OUT THE METHOD

CROSS REFERENCE TO RELATED APPLICATIONS

This application is a continuation of PCT International Application No. PCT/EP2016/051066, filed Jan. 20, 2016, which claims priority under 35 U.S.C. § 119 from German Patent Application No. 10 2015 204 389.4, filed Mar. 11, 2015, the entire disclosures of which are herein expressly incorporated by reference.

BACKGROUND AND SUMMARY OF THE INVENTION

A method is described for determining a position of a single-track vehicle. A device for carrying out the method is also described.

To determine the position of a vehicle, the use of a satellite-based positioning system, such as the Global Positioning System (GPS), is known. A precondition for correct functioning of determining the position by way of a satellite-based positioning system is that adequate communication with corresponding satellites is possible. However, in various situations, for example when traveling in a tunnel, in deep road cuttings and/or in parking garages this is only possible with limitations or not at all.

The term "dead reckoning" is taken to mean the process of estimating a momentary position based on a previously determined position and moving this position forward on the basis of a series of measured parameters. These parameters can include, for example, the speed, acceleration and/or the yaw rate of a vehicle, which are measured by use of one or more vehicle sensors. DE 10 2010 031 351 A1 describes such a vehicle sensor.

A drawback of the methods known in the prior art of determining a position of a vehicle is that the known methods are only inadequately suited for use with single-track vehicles which, when traveling through curves, incline towards the inside of the curve. When the vehicle sensors described in the prior art are used in single track vehicles, the inclined orientation-dependent yaw rate, i.e. the yaw rate measured in the vertical axis of the single-track vehicle, is measured. However, in the case of the known methods, dead-reckoning algorithms known from the private car sector cannot be used for single-track vehicles.

It is therefore an object of the invention to provide a method of determining a position by which, in the case of single-track vehicles, it is possible to continue navigating in the event of failure of the GPS signal. A further object of the invention is to provide a device for implementing the method.

These and other objects are achieved through a method and a device according to embodiments of the invention.

According to one form of embodiment, in a method of determining a position of a single-track vehicle, an inclined position of the single-track vehicle and a speed of the single-track vehicle are determined. Preferably, the inclined orientation and/or the speed of the single-track vehicle is/are measured by way of one or more sensors. The speed of the single-track vehicle can, for example, be measured by way of a wheel rotation sensor. To measure the inclined orientation of the single-track vehicle, a device for determining an inclined orientation angle can be used, for example. With regard to this, reference is made to unexamined and published patent application DE 10 2006 057 667 A1, the content of which, particularly in relation to the device described therein for determining an inclined orientation angle in the case of a single-track vehicle, is incorporated by reference herein.

When traveling through curves, the single-track vehicle has a vehicle path yaw rate and a yaw rate dependent on the inclined orientation which differs from the vehicle path yaw rate. The inclined orientation-dependent yaw rate depends on the current inclined orientation of the single-track vehicle, i.e. the inclination angle of the single-track vehicle, and is measured in the direction of the vertical vehicle axis of the single-track vehicle. To measure the inclined orientation-dependent yaw rate of the single-track vehicle, in the described method a yaw rate sensor, such as a gyrometer can be used for example.

From the measured inclined orientation and the measured speed, the vehicle path yaw rate of the single track vehicle is determined. The vehicle path yaw rate is often the yaw rate perpendicular to the surface of the roadway simply designated with the term "yaw rate" and can here and in the following also be called the path angle speed. The vehicle path yaw rate co, can in particular be determined via the following equation:

$$\omega_z = (\sin(\varphi) \cdot g)/(v \cdot \cos(\varphi)),$$

where $\varphi$ is the inclination angle or the inclined orientation of the single-track vehicle, v the speed of the single-track vehicle and g the ground acceleration.

By way of the method described here the navigation of a single-track vehicle is advantageously made possible in the event of a short-term failure of the GPS signal. In addition to the navigation of a single-track vehicle this is also particularly of relevance in connection with the breaking off of emergency calls (known as "E-call").

In accordance with a further form of embodiment, in order to determine the position of the single-track vehicle, a dead-reckoning algorithm is used which employs the vehicle path yaw rate for calculating the position of the single-track vehicle. Advantageously, through the determined vehicle path yaw rate of the single-track vehicle, dead-reckoning algorithms known from the private car sector can be used for dead reckoning in the case of the single track vehicle.

In addition, a device for implementing the method described here is set out. The device can have one or more features of the forms of embodiment already cited in connection with the method.

For example, the device can comprise one or more vehicle sensors, such as a wheel rotation sensor, gyrometer, inclination sensor etc. Furthermore, the device can comprise a calculation unit, such as a computer having a processor and associated memory, to execute a programmed method for determining the vehicle path yaw rate of the single-track vehicle on the basis of the variables determined by way of the vehicle sensor(s), in particular the inclined orientation and the speed of the single-track vehicle.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic view of a single-track vehicle 1 when traveling in a curve according to one example of embodiment.

DETAILED DESCRIPTION OF THE DRAWING

In FIG. 1, while traveling in a curve, the single-track vehicle 1 exhibits an angle of inclination φ between the vertical axis of the vehicle 3 and roadway 2.

In FIG. 1, the force of gravity $F_G$, the component $F_G'$ of the weight perpendicular to the vertical axis 3 of the vehicle and the centrifugal force $F_{zf}$ acting on the center of gravity 4 of the single-track vehicle 1 are also shown.

When traveling through the curve the single-track vehicle 1 exhibits a vehicle path yaw rate $\omega_z$ perpendicular to a surface of the roadway and an inclination orientation-dependent yaw rate $\omega_z'$ in the direction of the vertical axis 3 of the vehicle.

In the method described here, in order to determine the position of the single-track vehicle 1, the inclined orientation φ of the single-track vehicle 1 and the speed v of the single-track vehicle 1 are measured.

From the measured inclined orientation φ and speed v, the vehicle path yaw rate $\omega_z$ of the single-track vehicle is determined. The vehicle path yaw rate $\omega_z$ can in particular be determined via the equation: $\omega_z = (\sin \varphi \cdot g)/(v \cdot \cos \varphi)$, where φ is the inclination angle or the inclined orientation of the single-track vehicle, v the speed of the single-track vehicle and g the ground acceleration.

By way of the method described here the navigation of a single-track vehicle is advantageously made possible in the event of a short-term failure of the GPS signal. In addition to the navigation of a single-track vehicle this is also particularly of relevance in connection with the breaking off of emergency calls (known as "E-call").

In accordance with a further form of embodiment, in order to determine the position of the single-track vehicle, a dead-reckoning algorithm is used which employs the vehicle path yaw rate for calculating the position of the single-track vehicle. Advantageously, through the determined vehicle path yaw rate of the single-track vehicle, dead-reckoning algorithms known from the private car sector can be used for dead reckoning in the case of the single track vehicle.

In addition, a device for implementing the method described here is set out. The device can have one or more features of the forms of embodiment already cited in connection with the method.

For example, the device can comprise one or more vehicle sensors, such as a wheel rotation sensor, gyrometer, inclination sensor etc. Furthermore, the device can comprise a calculation unit, such as a computer having a processor and associated memory, to execute a programmed method for determining the vehicle path yaw rate of the single-track vehicle on the basis of the variables determined by way of the vehicle sensor(s), in particular the inclined orientation and the speed of the single-track vehicle.

LIST OF REFERENCE NUMBERS

1. Single track vehicle
2. Ground
3. Vertical axis of the vehicle
4. Centre of gravity m Mass
v Speed
$F_G$ Force of gravity
$F_G'$ Component of $F_G$ perpendicular to the vertical axis of the vehicle
$F_{zf}$ Centrifugal force
$\omega_z$ Vehicle path yaw rate
$\omega_z'$ Inclined orientation-dependent yaw rate
φ Angle of inclination The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of determining a position of a single-track vehicle, wherein when traveling in a curve the single-track vehicle has a vehicle-path yaw rate ($\omega_z$) and an inclined orientation-dependent yaw rate ($\omega_z'$) which differs from the vehicle-path yaw rate ($\omega_z$), the method comprising the acts of:

measuring an inclined orientation (φ) of the single-track vehicle inclined orientation-dependent yaw rate ($\omega_z'$) and a speed (v) of the single-track vehicle using one or more of a wheel rotation sensor, a gyrometer and an inclination sensor;

determining, from the measured inclined orientation (φ) and the measured speed (v), the vehicle path yaw rate ($\omega_z$) using a calculation unit executing a vehicle path yaw rate determining algorithm;

determining using the calculation unit the position of the single-track vehicle from the vehicle path yaw rate ($\omega_z$) and a vehicle position previously determined by a GPS system; and navigating the single-track vehicle based on the determined position of the single-track vehicle.

2. The method according to claim 1, wherein the vehicle path yaw rate $\omega_z$ is determined by the equation:

$$\omega_z = (\sin(\varphi) \cdot g)/(v \cdot \cos(\varphi)),$$

where φ is an inclination angle or an inclined orientation of the single-track vehicle, v is the speed of the single-track vehicle, and g is a ground acceleration.

3. The method according to claim 2, wherein, for determining the position of the single-track vehicle, a dead-reckoning algorithm is used which employs the vehicle path yaw rate ($\omega_z$) to calculate the position of the single-track vehicle.

4. The method according to claim 1, wherein, for determining the position of the single-track vehicle, a dead-reckoning algorithm is used which employs the vehicle path yaw rate ($\omega_z$) to calculate the position of the single-track vehicle.

5. A device for determining a position of a single-track vehicle, the device comprising at least one calculating unit including a processor that executes at least one algorithm to:

measure an inclined orientation (φ) of the single-track vehicle and a speed (v) of the single-track vehicle using one or more of anwheel rotation sensor, a gyrometer and an inclination sensor;

determine, from the measured inclined orientation (φ) and the measured speed (v) the vehicle path yaw rate ($\omega_z$) using a vehicle path yaw determining algorithm;

determine the position of the single-track vehicle from the vehicle path yaw rate ($\omega_z$) and a vehicle position previously determined by a GPS system; and navigate the single-track vehicle based on the determined position of the single-track vehicle.

6. The device according to claim 5, wherein
at least one vehicle sensor measures the inclined orientation and the speed of the single-track vehicle, and the calculating unit determines the vehicle path yaw rate of the single-track vehicle as a function of variables recorded by way of the at least one vehicle sensor.

7. The device according to claim 6, wherein the calculating unit determines the vehicle path yaw rate based on the following equation:

$$\omega_z = (\sin(\varphi) \cdot g)/(v \cdot \cos(\varphi)),$$

where $\varphi$ is an inclination angle or an inclined orientation of the single-track vehicle, v is the speed of the single-track vehicle, and g is a ground acceleration.

8. The device according to claim 7, wherein the calculating unit executes program code to determine the position of the single-track vehicle via a dead-reckoning algorithm that employs the vehicle path yaw rate to calculate the position of the single-track vehicle.

* * * * *